(12) United States Patent
Furuta et al.

(10) Patent No.: US 10,267,983 B2
(45) Date of Patent: Apr. 23, 2019

(54) PLANAR ILLUMINATION APPARATUS

(71) Applicant: Minebea Mitsumi Inc., Nagano (JP)

(72) Inventors: Makoto Furuta, Fukuroi (JP); Takahito Yoshida, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 27 days.

(21) Appl. No.: 15/636,060

(22) Filed: Jun. 28, 2017

(65) Prior Publication Data

US 2018/0003879 A1 Jan. 4, 2018

(30) Foreign Application Priority Data

Jul. 1, 2016 (JP) .................................. 2016-131298

(51) Int. Cl.
*F21V 8/00* (2006.01)

(52) U.S. Cl.
CPC ........... *G02B 6/009* (2013.01); *G02B 6/0051* (2013.01); *G02B 6/0055* (2013.01); *G02B 6/0083* (2013.01)

(58) Field of Classification Search
CPC .... G02B 6/005; G02B 6/0051; G02B 6/0055; G02B 6/0088; G02B 6/009; G02B 6/0091; G02B 6/0093
See application file for complete search history.

(56) References Cited

U.S. PATENT DOCUMENTS

| | | | | |
|---|---|---|---|---|
| 2007/0008457 A1* | 1/2007 | Takahashi | ............ | G02B 6/0018 349/64 |
| 2008/0037285 A1* | 2/2008 | Eda | ...................... | G02B 6/0083 362/631 |
| 2008/0192505 A1 | 8/2008 | Park | | |
| 2009/0207630 A1* | 8/2009 | Satoh | ................... | G02B 6/0085 362/615 |
| 2012/0153313 A1* | 6/2012 | Yokotani | ............... | H01L 33/486 257/88 |
| 2013/0077344 A1 | 3/2013 | Kokubu et al. | | |

(Continued)

FOREIGN PATENT DOCUMENTS

| JP | 2008-298905 A | 11/2008 |
|---|---|---|
| JP | 2008-298905 A | 12/2008 |

(Continued)

OTHER PUBLICATIONS

Notification of Reasons for Refusal dated Jun. 26, 2018 for corresponding Japanese Application No. 2016-131298 and English translation.

*Primary Examiner* — Thien M Le
*Assistant Examiner* — April A Taylor
(74) *Attorney, Agent, or Firm* — Pearne & Gordon LLP

(57) ABSTRACT

A planar illumination apparatus according to an embodiment includes: a light-guiding plate that emits light made incident from a side face; a plurality of light sources that are arranged on the side face side and have respective light-emitting faces that emit light to be made incident on the side face; a substrate having a mounting face on which the light sources are mounted, the mounting face facing a face of the light sources opposite the light-emitting faces; and wiring that is formed on a face of the substrate opposite the mounting face and are connected to the light sources. The wiring includes wiring extending from both ends of the light sources connected in series.

11 Claims, 12 Drawing Sheets

(56) References Cited

U.S. PATENT DOCUMENTS

| | | | |
|---|---|---|---|
| 2013/0107526 A1* | 5/2013 | Ishibashi | H05K 1/189 |
| | | | 362/237 |
| 2013/0229596 A1* | 9/2013 | Hosoki | F21V 21/00 |
| | | | 349/65 |
| 2014/0036205 A1* | 2/2014 | Sugiura | H01L 25/0753 |
| | | | 349/69 |
| 2015/0173137 A1 | 6/2015 | Ono et al. | |
| 2015/0179905 A1* | 6/2015 | Ohmae | G02F 1/133603 |
| | | | 257/88 |

FOREIGN PATENT DOCUMENTS

| JP | 2013-073753 A | 4/2013 |
|---|---|---|
| JP | 2014-022117 A | 2/2014 |

\* cited by examiner

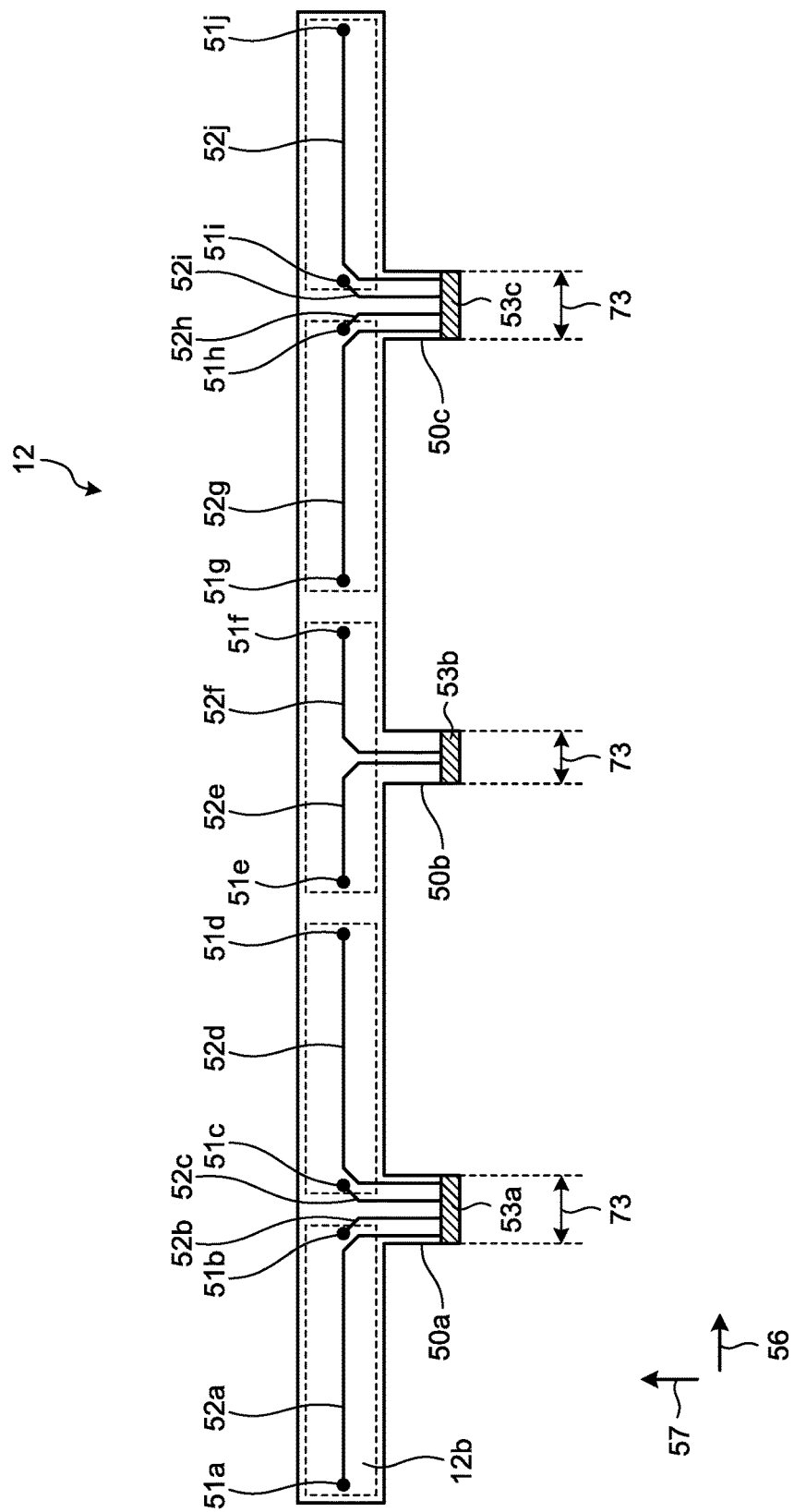

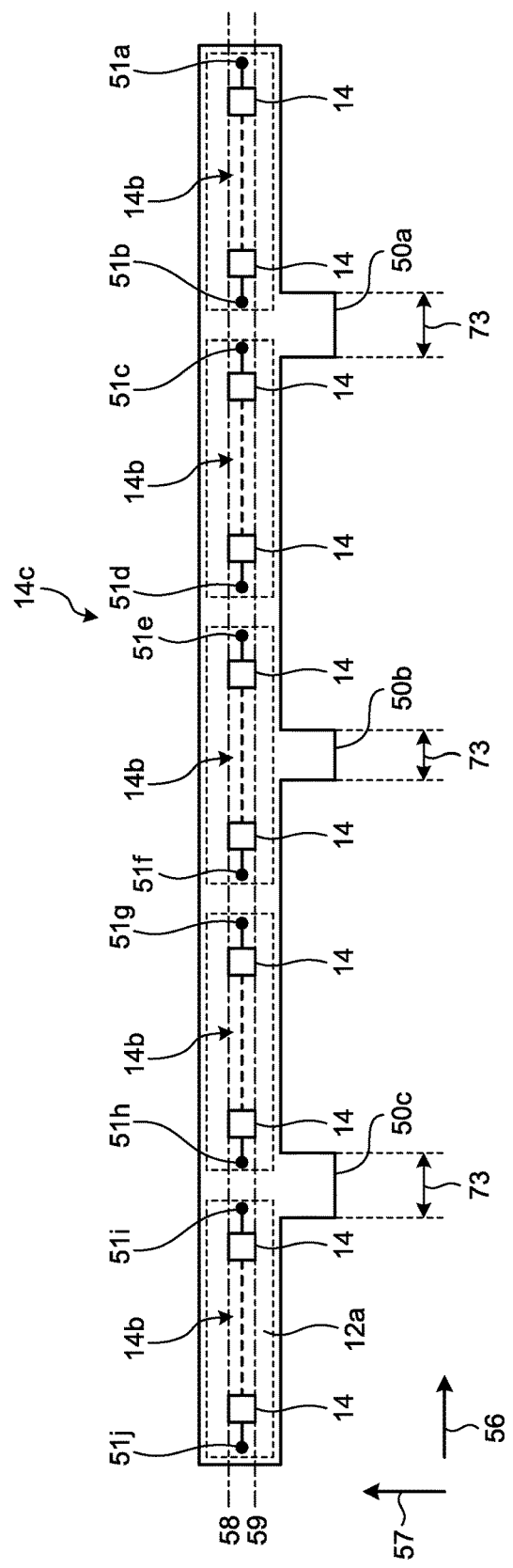

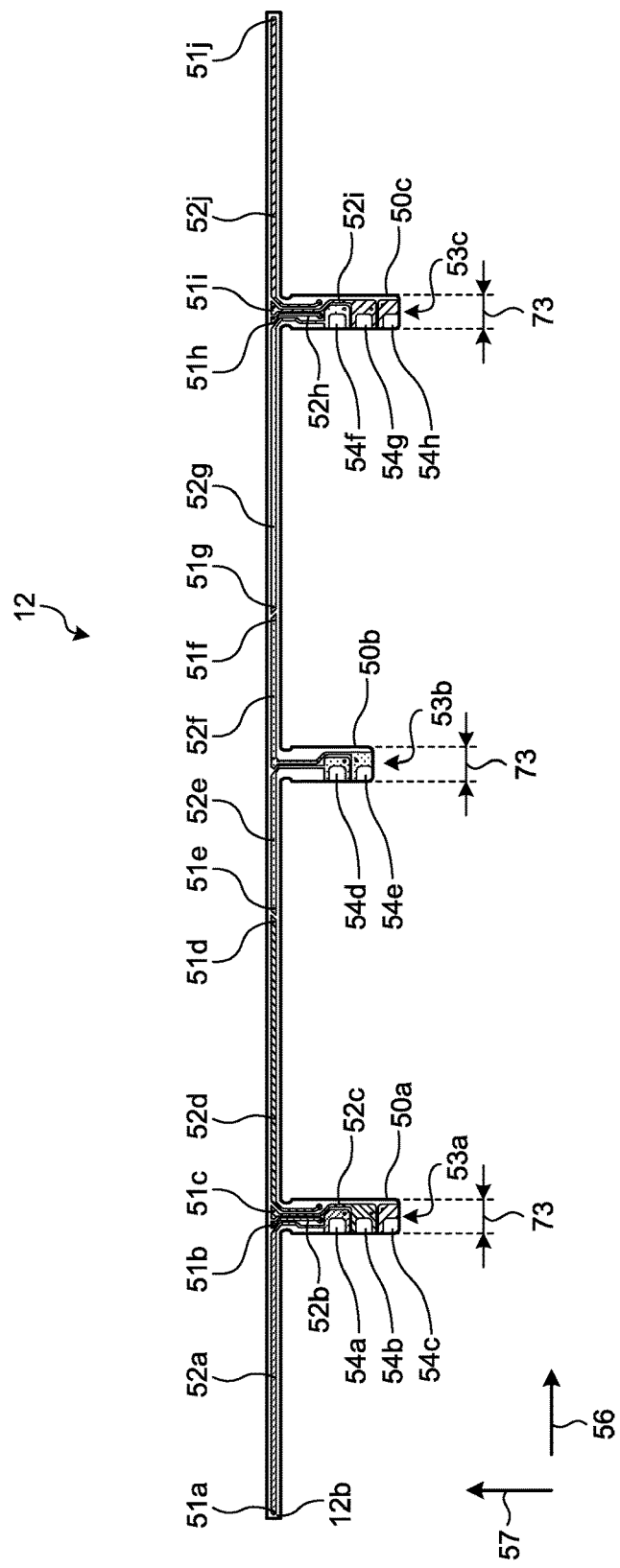

PLANAR ILLUMINATION APPARATUS

CROSS-REFERENCE TO RELATED APPLICATIONS

The present application claims priority to and incorporates by reference the entire contents of Japanese Patent Application No. 2016-131298 filed in Japan on Jul. 1, 2016.

BACKGROUND OF THE INVENTION

1. Field of the Invention

The present invention relates to a planar illumination apparatus.

2. Description of the Related Art

In some planar illumination apparatuses, top view type light emitting diodes (LEDs) are arranged so as to face a light-incident face of a light-guiding plate. In such planar illumination apparatuses, a plurality of LED rows are connected in parallel, for example (refer to Japanese Patent Application Laid-open No. 2008-298905, for example).

However, when the LED rows are connected in parallel, a plurality of wiring is routed to the lower part of strip-shaped flexible printed circuits (FPC) on which the LEDs are mounted, which inevitably increases the short side width of the FPC.

The present invention has been made in view of the foregoing circumstances, and an object thereof is to provide a planar illumination apparatus that can be thinned even when top view type LEDs are used.

SUMMARY OF THE INVENTION

A planar illumination apparatus according to one embodiment of the present invention includes a light-guiding plate that emits light made incident from a side face; a plurality of light sources that are arranged on the side face side and have respective light-emitting faces that emit light to be made incident on the side face, a substrate having a mounting face on which the light sources are mounted, the mounting face facing a face of the light sources opposite the light-emitting faces and wiring that is formed on a face of the substrate opposite the mounting face and is connected to the light sources. The wiring includes wiring extending from both ends of the light sources connected in series.

BRIEF DESCRIPTION OF THE DRAWINGS

FIG. 3A is a schematic elevational view of a principal face (a face opposite a mounting face) of an FPC according to the embodiment;

FIG. 3B is a schematic elevational view of the mounting face of the FPC according to the embodiment;

FIG. 4 is an elevational view of a specific example of the principal face (the face opposite the mounting face) of the FPC according to the embodiment;

DETAILED DESCRIPTION OF THE PREFERRED EMBODIMENTS

Figure 1:
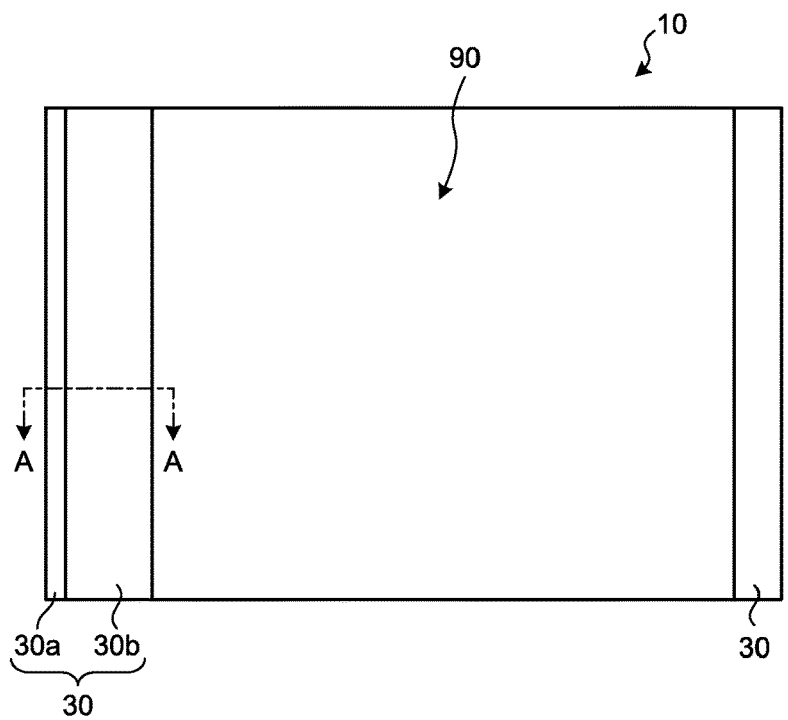
FIG. 1 is an elevational view of an example of appearance of a planar illumination apparatus according to an embodiment.

The following describes a planar illumination apparatus according to an embodiment with reference to the accompanying drawings. The dimensional relation among components, the ratio among the components, and the like in the drawings may be different from actual ones. The drawings may include some parts that are different in mutual dimensional relation and ratio.

Embodiment

FIG. 1 is an elevational view of an example of appearance of a planar illumination apparatus according to the embodiment. As illustrated in the example in FIG. 1, this planar illumination apparatus 10 according to the embodiment emits light from an emission area (also referred to as an effective area) 90, which is not covered with a light-shielding sheet 30 that includes a first light-shielding sheet 30a and a second light-shielding sheet 30b. In other words, the light-shielding sheet 30 defines the effective area 90. The planar illumination apparatus 10 according to the present embodiment is used as a backlight of a liquid crystal display apparatus. Such a liquid crystal display apparatus is used for a smartphone, for example.

In FIG. 1, the left light-shielding sheet 30 is wider than the right light-shielding sheet 30. This is because the right light-shielding sheet 30 covers a relatively narrower area, in which an LED 14, a flexible printed circuit (FPC) 12, and the like described below are not included, whereas the left light-shielding sheet 30 covers a relatively wider area, in which the LED 14, the FPC 12, and the like described below are included. The width of the left light light-shielding sheet 30 is 1.5 mm, for example.

Figure 2:
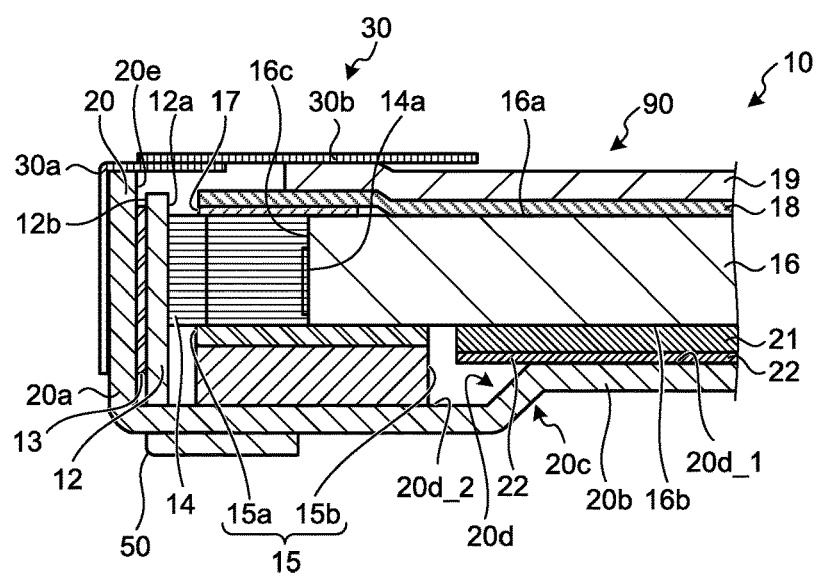
FIG. 2 is a sectional view taken from the A-A line of FIG. 1.

FIG. 2 is a sectional view taken from the A-A line of FIG. 1. As illustrated in FIG. 2, the planar illumination apparatus 10 has the FPC 12 as a substrate (a mounting substrate), a fixing member 13, the LED 14 as a light source (a point-shaped light source), a first coupling member 15, a light-guiding plate 16, a second coupling member 17, a diffusion sheet 18, a prism sheet 19, a frame 20, a reflective sheet 21, and the light-shielding sheet 30. The planar illumination apparatus 10 also has a spacer tape 80 (refer to FIG. 10) described below.

The frame 20 has a side wall 20a and a bottom 20b that house the FPC 12, the fixing member 13, the LED 14, the first coupling member 15, the light-guiding plate 16, the second coupling member 17, the diffusion sheet 18, and the prism sheet 19. The frame 20 is a stainless sheet metal frame, for example, which is high in rigidity and light reflectivity.

The bottom 20b is a part extending along a principal face 16b described below of the light-guiding plate 16. The bottom 20b has a floor face 20d. The floor face 20d has a plane 20d_1 and a recessed plane 20d_2 of a recess 20c described below. The light-guiding plate 16 is placed on the plane 20d_1. The side wall 20a is a part erected from the bottom 20b integrally in a light emission direction (a direction normal to the plane 20d_1 of the floor face 20d) along a long side of a light-incident side face 16c described below of the light-guiding plate 16. The side wall 20a has a side face 20e as an inner side face. The bottom 20b has the recess 20c. The recess 20c is a member that is formed to be recessed in a direction opposite a direction in which light is emitted from a part of the floor face 20d on the side face 20e side along the side face 20e and releases a lower end of the FPC 12. The recess 20c has a recessed face 20d_2. The first coupling member 15 is arranged on the recess 20c (specifically, on the recessed face 20d_2 of the recess 20c), and when the width of the recess 20c is relatively larger, the first coupling member 15 having a larger size can be arranged on the recess 20c.

Three (a plurality of) holes 60a to 60c (refer to FIG. 6) described below are formed astride a part of the recess 20c on the side wall 20a side and a lower end part of the side wall 20a. When the three holes 60a to 60c are described without distinguishing them one from another, they may be denoted by "holes 60." The holes 60 may be formed at least in the recess 20c of the bottom 20b.

The light-guiding plate 16 is formed in a rectangular shape in a top view using a transparent material (a polycarbonate resin, for example). The light-guiding plate 16 has on its outer face two principal faces 16a and 16b and a light-incident side face (a light-incident face) 16c as a side face on the side on which the LED 14 is arranged. Light emitted by the LED 14 is made incident on the light-incident side face 16c. One principal face 16a out of the two principal faces 16a and 16b is an emission face from which the light made incident from the light-incident side face 16c (the light emitted by the LED 14) is emitted. Given this situation, the following description may denote the "principal face 16a" as an "emission face 16a." An optical path changing pattern formed of a plurality of dots, for example, is formed on a part on the principal face (the principal face other than the principal face 16a out of the two principal faces) 16b side as a face opposite the emission face 16a of the light-guiding plate 16. By forming the optical path changing pattern, the travel direction of light propagating through the light-guiding plate 16 is changed, and the light is emitted from the emission face 16a. In other words, the planar illumination apparatus 10 according to the embodiment is what is called an edge light type illumination apparatus.

The reflective sheet 21 reflects light leaked from the principal face 16b opposite the emission face 16a and again returns the light to the light-guiding plate 16. The reflective sheet 21 is arranged in between the principal face 16b of the light-guiding plate 16 and the floor face 20d while being fixed onto the floor face 20d (specifically, the plane 20d_1 of the floor face 20d) using a double-sided tape 22.

The double-sided tape 22 is a white double-sided tape, for example; one face thereof is attached to part of the reflective sheet 21, whereas the other face thereof is attached to the floor face 20d (specifically, the plane 20d_1 of the floor face 20d). With this structure, the double-sided tape 22 fixes the reflective sheet 21 onto the floor face 20d.

The LED 14 is a light source having a point shape (a point-shaped light source). The LED 14 is a pseudo-white LED including a blue LED and a yellow fluorophore, for example. The LED 14 is what is called a top view type LED that is formed in a substantially rectangular parallelepipedal shape as a whole and the face opposite a light-emitting face 14a faces a mounting face (a principal face 12a) described below of the FPC 12 when being mounted on the FPC 12. In the present embodiment, a plurality of LEDs 14 are provided, and the LEDs 14 are arranged spaced apart from each other by certain intervals along the long side direction of the light-incident side face 16c with their light-emitting faces 14a facing the light-incident side face 16c of the light-guiding plate 16. The LEDs 14 emit light toward the light-incident side face 16c. The LEDs 14 thus emit light to be made incident on the light-incident side face 16c.

The FPC 12 is a strip-shaped substrate having two principal faces 12a and 12b. Out of the two principal faces 12a and 12b, the principal face 12a is the mounting face on which the LEDs 14 are mounted. For this reason, the following may denote the "principal face 12a" as a "mounting face 12a." The mounting face 12a faces the face of the LEDs 14 opposite the light-emitting faces 14a. Control by a drive circuit (not illustrated) via the FPC 12 and an FPC 70 described below drives and lights the LEDs 14. The principal face 12b is the face opposite the mounting face 12a.

FIG. 3A is a schematic elevational view of the principal face 12b of the FPC 12 according to the embodiment, whereas FIG. 3B is a schematic elevational view of the mounting face 12a of the FPC 12 according to the embodiment. FIG. 4 is an elevational view of a specific example of the principal face 12b of the FPC 12 according to the embodiment. As illustrated in FIG. 3B, five LED rows (light source rows) 14b, which are the rows of the LEDs 14, in which nine LEDs 14 are connected in series, are connected in parallel on the mounting face 12a. In other words, a total of 45 LEDs 14 are mounted on the mounting face 12a. The total number of the LEDs 14, the number of the LEDs 14 contained in the LED rows 14b, and the paralleled number are not limited to this example. These 45 LEDs 14 are referred to as an LED group 14c.

As illustrated in FIG. 3A, FIG. 3B, and FIG. 4, the FPC 12 is formed with through holes 51a to 51j. When the ten through holes 51a to 51j are described without distinguishing them one from another below, they may be denoted as the "through holes 51." In FIG. 3B, among the nine LEDs 14 contained in the rightmost (far right) LED row 14b, the rightmost LED 14 is connected to wiring 52a illustrated in FIG. 3A and FIG. 4 via the through hole 51a. In FIG. 3B, among the nine LEDs 14 contained in the far right LED row 14b, the leftmost LED 14 is connected to wiring 52b illustrated in FIG. 3A and FIG. 4 via the through hole 51b. In other words, the wiring 52a is connected to the through hole 51a, whereas the wiring 52b is connected to the through hole 51b.

In FIG. 3B, among the nine LEDs 14 contained in the second far right LED row 14b, the rightmost LED 14 is connected to wiring 52c illustrated in FIG. 3A and FIG. 4 via the through hole 51c. In FIG. 3B, among the nine LEDs 14 contained in the second far right LED row 14b, the leftmost LED 14 is connected to wiring 52d illustrated in FIG. 3A and FIG. 4 via the through hole 51d. In other words, the wiring 52c is connected to the through hole 51c, whereas the wiring 52d is connected to the through hole 51d.

As illustrated in FIG. 3A, the FPC 12 according to the present embodiment has three (a plurality of (the same number as that of the holes 60)) external connecting parts 50*a*, 50*b*, and 50*c*. The external connecting parts 50*a*, 50*b*, and 50*c* are elongated strip-shaped. The external connecting part 50*a* is formed with a conducting part 53*a*. The wiring 52*a*, the wiring 52*b*, the wiring 52*c*, and the wiring 52*d* are connected to the conducting part 53*a*. In other words, the FPC 12 has one external connecting part 50*a* for two LED rows 14*b*. The conducting part 53*a* is electrically connected to the FPC 70 described below.

In FIG. 3B, among the nine LEDs 14 contained in the third far right LED row 14*b*, the rightmost LED 14 is connected to wiring 52*e* illustrated in FIG. 3A and FIG. 4 via the through hole 51*e*. In FIG. 3B, among the nine LEDs 14 contained in the third far right LED row 14*b*, the leftmost LED 14 is connected to wiring 52*f* illustrated in FIG. 3A and FIG. 4 via the through hole 51*f*. In other words, the wiring 52*e* is connected to the through hole 51*e*, whereas the wiring 52*f* is connected to the through hole 51*f*.

As illustrated in FIG. 3A, the external connecting part 50*b* is formed with a conducting part 53*b*. The wiring 52*e* and the wiring 52*f* are connected to the conducting part 53*b*. In other words, the FPC 12 has one external connecting part 50*b* for one LED row 14*b*. The conducting part 53*b* is electrically connected to the FPC 70 described below.

In FIG. 3B, among the nine LEDs 14 contained in the second far left LED row 14*b*, the rightmost LED 14 is connected to wiring 52*g* illustrated in FIG. 3A and FIG. 4 via the through hole 51*g*. In FIG. 3B, among the nine LEDs 14 contained in the second far left LED row 14*b*, the leftmost LED 14 is connected to wiring 52*h* illustrated in FIG. 3A and FIG. 4 via the through hole 51*h*. In other words, the wiring 52*g* is connected to the through hole 51*g*, whereas the wiring 52*h* is connected to the through hole 51*h*.

In FIG. 3B, among the nine LEDs 14 contained in the leftmost LED row 14*b*, the rightmost LED 14 is connected to wiring 52*i* illustrated in FIG. 3A and FIG. 4 via the through hole 51*i*. In FIG. 3B, among the nine LEDs 14 contained in the leftmost LED row 14*b*, the leftmost LED 14 is connected to wiring 52*j* illustrated in FIG. 3A and FIG. 4 via the through hole 51*j*. In other words, the wiring 52*i* is connected to the through hole 51*i*, whereas the wiring 52*j* is connected to the through hole 51*j*.

As illustrated in FIG. 3A, the external connecting part 50*c* is formed with a conducting part 53*c*. The wiring 52*g*, the wiring 52*h*, the wiring 52*i*, and the wiring 52*j* are connected to the conducting part 53*c*. In other words, the FPC 12 has one external connecting part 50*c* for two LED rows 14*b*. The conducting part 53*c* is electrically connected to the FPC 70 described below.

When the external connecting parts 50*a* to 50*c* are described without distinguishing them one from another below, they may be denoted as the "external connecting parts 50." When the wiring 52*a* to 52*j* are described without distinguishing one from another, they may be denoted as the "wiring 52." When the conducting parts 53*a* to 53*c* are described without distinguishing them one from another, they may be denoted as the "conducting parts 53."

The following describes specific examples of the conducting parts 53*a* to 53*c* with reference to FIG. 4. As illustrated in FIG. 4, the conducting part 53*a* has a connecting pad 54*a*, a connecting pad 54*b*, and a connecting pad 54*c*. The wiring 52*a* is connected to the connecting pad 54*a*, the wiring 52*c* is connected to the connecting pad 54*b*, and the wiring 52*b* and wiring 52*d* are connected to the connecting pad 54*c*. The wiring 52*a* is connected to the cathode of the rightmost LED 14 among the nine LEDs 14 contained in the rightmost LED row 14*b* in FIG. 3B, for example. The wiring 52*b* is connected to the anode of the leftmost LED 14 among the nine LEDs 14 contained in the rightmost LED row 14*b* in FIG. 3B. The wiring 52*c* is connected to the cathode of the rightmost LED 14 among the nine LEDs 14 contained in the second far right LED row 14*b* in FIG. 3B. The wiring 52*d* is connected to the anode of the leftmost LED 14 among the nine LEDs 14 contained in the second far right LED row 14*b* in FIG. 3B.

The conducting part 53*b* has a connecting pad 54*d* and a connecting pad 54*e*. The wiring 52*e* is connected to the connecting pad 54*d*, whereas the wiring 52*f* is connected to the connecting pad 54*e*. The wiring 52*e* is connected to the cathode of the rightmost LED 14 among the nine LEDs 14 contained in the third far right LED row 14*b* in FIG. 3B, for example. The wiring 52*f* is connected to the anode of the leftmost LED 14 among the nine LEDs 14 contained in the third far right LED row 14*b* in FIG. 3B The conducting part 53*c* has a connecting pad 54*f*, a connecting pad 54*g*, and a connecting pad 54*h*. The wiring 52*g* is connected to the connecting pad 54*f*, the wiring 52*i* is connected to the connecting pad 54*g*, and the wiring 52*h* and the wiring 52*j* are connected to the connecting pad 54*h*. The wiring 52*g* is connected to the cathode of the rightmost LED 14 among the nine LEDs 14 contained in the second far left LED row 14*b* in FIG. 3B, for example. The wiring 52*h* is connected to the anode of the leftmost LED 14 among the nine LEDs 14 contained in the second far left LED row 14*b* in FIG. 3B. The wiring 52*i* is connected to the cathode of the rightmost LED 14 among the nine LEDs 14 contained in the leftmost LED row 14*b* in FIG. 3B. The 52*j* is connected to the anode of the leftmost LED 14 among the nine LEDs 14 contained in the leftmost LED row 14*b* in FIG. 3B.

When the connecting pads 54*a* to 54*h* are described without distinguishing them one from another below, they may be denoted as the "connecting pads 54." The wiring 52 connected to the anodes of the LEDs 14 may be connected to the cathodes of the LEDs 14, whereas the wiring 52 connected to the cathodes of the LEDs 14 may be connected to the anodes of the LEDs 14.

As described above, the wiring 52 connected to the respective LED row 14*b* (the LEDs 14 (the nine LEDs 14 in the present embodiment)) is formed on the principal face 12*b* of the FPC 12 opposite the mounting face 12*a*. In other words, the wiring 52 connected to the LEDs 14 is formed on the principal face 12*b*. The "wiring 52 connected to the LEDs 14" does not mean the wiring 52 connected to the respective LEDs 14 but means the wiring 52 connected to the LED rows 14*b* as the LEDs 14. More specifically, the "wiring 52 connected to the LEDs 14" means the wiring 52 connected to the LEDs 14 at both ends of the LEDs 14 connected in series. The wiring 52 includes wiring extending from both ends of the respective LED rows 14*b* (the nine LEDs 14 in the present embodiment).

As illustrated in FIG. 3B, the LEDs 14 contained in the LED rows 14*b* are mounted side by side in the longitudinal direction of the FPC 12 (a first direction) indicated by the arrow 56 on the mounting face 12*a*.

The following describes examples of the shape of the ten wiring 52 (52*a* to 52*j*). The following first describes the shape of the wiring 52*a*, 52*d*, 52*e*, 52*f*, 52*g*, and 52*j* among the ten wiring 52 (52*a* to 52*j*) illustrated in FIG. 3A and FIG. 4; the positions of the through holes 51 to which the wiring 52*a*, 52*d*, 52*e*, 52*f*, 52*g*, and 52*j* are connected in the first direction are out of a range (a first direction range) 73 from one end to another end in the first direction of the external connecting parts 50 to which the wiring 52*a*, 52*d*, 52*e*, 52*f*, 52*g*, and 52*j* are connected. The wiring 52*a*, 52*d*, 52*e*, 52*f*, 52*g*, and 52*j* are formed on the principal face 12*b* along the first direction at the central part in a direction orthogonal to the first direction (the short side direction of the FPC 12 indicated by the arrow 57 in FIG. 3B (a second direction)) before entering the first direction range 73 of the external connecting parts 50 to which the wiring 52*a*, 52*d*, 52*e*, 52*f*, 52*g*, and 52*j* are connected from the through holes 51 to which the wiring 52*a*, 52*d*, 52*e*, 52*f*, 52*g*, and 52*j* are connected in the first direction. Upon entering the first direction range 73, the wiring 52*a*, 52*d*, 52*e*, 52*f*, 52*g*, and 52*j* are formed on the principal face 12*b* so as to extend toward the external connecting parts 50 to which they are connected (in a direction crossing the first direction).

The following describes the shape of the wiring 52*b*, 52*c*, 52*h*, and 52*i* among the ten wiring 52 (52*a* to 52*j*); the positions of the through holes 51 to which the wiring 52*b*, 52*c*, 52*h*, and 52*i* are connected in the first direction are within the first direction range 73 of the external connecting parts 50 to which the wiring 52*b*, 52*c*, 52*h*, and 52*i* are connected. The wiring 52*b*, 52*c*, 52*h*, and 52*i* are formed on the principal face 12*b* so as to extend toward the external connecting parts 50 to which they are connected (in a direction crossing the first direction) from the through holes 51 to which they are connected.

The wiring 52*a* and the wiring 52*b* illustrated in FIG. 3A and FIG. 4 are connected to the rightmost LED row 14*b* in FIG. 3B. The wiring 52*c* and the wiring 52*d* illustrated in FIG. 3A and FIG. 4 are connected to the second far right LED row 14*b* in FIG. 3B. The wiring 52*e* and the wiring 52*f* illustrated in FIG. 3A and FIG. 4 are connected to the third far right LED row 14*b* in FIG. 3B. The wiring 52*g* and the wiring 52*h* illustrated in FIG. 3A and FIG. 4 are connected to the second far left LED row 14*b* in FIG. 3B. The wiring 52*i* and the wiring 52*j* illustrated in FIG. 3A and FIG. 4 are connected to the leftmost LED row 14*b* in FIG. 3B. The wiring 52*a*, 52*d*, 52*e*, 52*f*, 52*g*, and 52*j* are the wiring 52 part of which is formed on the principal face 12*b* along the first direction at the central part of the FPC 12 in the second direction.

Consequently, any of the LED rows 14*b* contains the wiring 52 part of which is formed on the principal face 12*b* along the first direction at the central part of the FPC 12 in the second direction. In other words, in any of the LED rows 14*b*, part of the wiring 52 is formed on the principal face 12*b* along the first direction at the central part of the FPC 12 in the second direction.

The following describes an example of the range of the central part. The mounting of the LEDs 14 contains a mounting error, and the positions of the LEDs 14 in the second direction are not necessarily the same for all the LEDs 14. Given this situation, in any of the LED rows 14*b*, in the principal face 12*b* of the FPC 12 illustrated in FIG. 3B, an area between the position of the LED 14 closest to one end of the FPC 12 in the second direction (the position of one end part of the LED 14 closest to the one end of the FPC 12 in the second direction) 58 and the position of the LED 14 closest to another end of the FPC 12 in the second direction (the position of another end part of the LED 14 closest to the other end of the FPC 12 in the second direction) 59 is defined as the range of the central part, and part of the wiring 52 is formed along the first direction within this range of the central part. The wiring is thus not formed in an area in which the LEDs 14 are not mounted of the mounting face 12*a*, but the wiring is formed at the central part of the principal face 12*b* opposite the mounting face 12*a*, and the width of the FPC 12 in the second direction can be reduced. Consequently, the planar illumination apparatus 10 according to the present embodiment can be thinned even when the top view type LEDs 14 are used.

The LED rows 14*b* as the LEDs 14 connected in series are mounted on the mounting face 12*a* while being arranged in the first direction, the external connecting parts 50 are provided for each one LED row 14*b* or two LED rows 14*b* adjacent in the first direction, and the wiring 52 formed on the principal face 12*b* in one LED row 14*b* does not overlap with the wiring 52 formed on the principal face 12*b* in another LED row 14*b* in the second direction. The wiring 52 in the one LED row 14*b* and the wiring 52 in the other LED row 14*b* do not thus overlap with each other in the second direction, the planar illumination apparatus 10 according to the present embodiment can be further thinned. In the present embodiment, three (a plurality of) external connecting parts 50 are provided. However, the number of the external connecting parts 50 is not limited to this example and may be four or more or two or less.

Referring back to the description of FIG. 2, the fixing member 13 fixes the FPC 12 to the side face 20*e* of the frame 20. The fixing member 13 is a double-sided tape, for example; one face thereof is attached to the principal face 12*b* of the FPC 12 opposite the mounting face 12*a*, whereas the other face thereof is attached to the side face 20*e*, whereby the FPC 12 is fixed to the side face 20*e*.

The first coupling member 15 is arranged in between the light-guiding plate 16 and the LEDs 14, and the floor face 20*d* (specifically, the recessed plane 20*d*_2 of the floor face 20*d*) to couple the light-guiding plate 16 and the LEDs 14 with each other optically or structurally. Specifically, the first coupling member 15 couples the light-incident side face 16*c* of the light-guiding plate 16 and the light-emitting faces 14*a* of the LEDs 14 with each other with the optical axis of the light-guiding plate 16 and the optical axis of the LEDs 14 aligned with each other. The first coupling member 15 is a strip-shaped single-sided tape and includes an adhesive layer (an adhesive agent) 15*a* and a base 15*b*.

The base 15*b* is PET, for example, whereas the adhesive layer 15*a* is silicone or acryl, for example. The adhesive layer 15*a* adheres to at least a part of the principal face 16*b* of the light-guiding plate 16 close to the LEDs 14 and adheres to at least a part of a face of the LEDs 14 on the floor face 20*d* side close to the light-guiding plate 16. With this structure, at least part of the principal face 16*b* of the light-guiding plate 16 and at least part of the face of the LEDs 14 on the floor face 20*d* side are mounted on the first coupling member 15. Consequently, the first coupling member 15 couples the light-incident side face 16*c* of the light-guiding plate 16 and the light-emitting faces 14*a* of the LEDs 14 with each other.

The following describes a case when the first coupling member 15 is a double-sided tape. In this case, the light-guiding plate 16 and the LEDs 14 are fixed to the floor face 20*d*, and when a force is externally applied to the planar illumination apparatus 10, the light-guiding plate 16 and the LEDs 14 may not be able to release the force and break. However, the first coupling member 15 according to the present embodiment is a single-sided tape, and the light-guiding plate 16 and the LEDs 14 are not fixed to the floor face 20*d*, whereby the light-guiding plate 16 and the LEDs 14 can release the external force. Consequently, the planar illumination apparatus 10 according to the present embodiment can lessen the occurrence of the breakage of the light-guiding plate 16 and the LEDs 14.

The first coupling member 15 has a member that absorbs light or a member that reflects light. When the first coupling member 15 has the member that reflects light, for example, the first coupling member 15 reflects light emitted from the light-emitting faces 14a of the LEDs 14 and returns the light to the light-guiding plate 16 again, whereby luminance can be improved.

The second coupling member 17 is arranged on the light-guiding plate 16 and the LEDs 14 opposite the first coupling member 15 and couples the light-guiding plate 16 and the LEDs 14 with each other optically or structurally. Specifically, the second coupling member 17 couples the light-incident side face 16c of the light-guiding plate 16 and the light-emitting faces 14a of the LEDs 14 with each other. The second coupling member 17 is arranged in between a diffusion sheet 18 described below and the light-guiding plate 16 and the LEDs 14. The second coupling member 17 is a double-sided tape; one face thereof is attached to at least a part of the emission face 16a of the light-guiding plate 16 close to the LEDs 14 and is attached to at least a part of a face of the LEDs 14 opposite the floor face 20d close to the light-guiding plate 16. With this structure, at least part of the emission face 16a of the light-guiding plate 16 and at least part of the face of the LEDs 14 opposite the floor face 20d are mounted on the second coupling member 17. Consequently, the second coupling member 17 couples the light-incident side face 16c of the light-guiding plate 16 and the light-emitting faces 14a of the LEDs 14 with each other.

The other face of the second coupling member 17 is attached to at least a part of the diffusion sheet 18 on the side wall 20a side. With this structure, the second coupling member 17 fixes the diffusion sheet 18 to the light-guiding plate 16 and the LEDs 14. Consequently, the second coupling member 17 can prevent the diffusion sheet 18 from floating from the light-guiding plate 16, thereby lessening the deterioration of luminance characteristics such as the luminance and luminance distribution of the light emitted from the effective area 90.

The diffusion sheet 18 is arranged on the emission face 16a side of the light-guiding plate 16 and diffuses the light emitted from the emission face 16a. Specifically, the diffusion sheet 18 is arranged so as to cover at least part of the emission face 16a and the face of the LEDs 14 opposite the floor face 20d to diffuse the light emitted from the emission face 16a. As described above, the diffusion sheet 18 is fixed to the light-guiding plate 16 and the LEDs 14 via the second coupling member 17.

The prism sheet 19 is arranged on the diffusion sheet 18 opposite the light-guiding plate 16, performs light distribution control on the light diffused by the diffusion sheet 18, and emits light subjected to the light distribution control.

The light-shielding sheet 30 is arranged so as to cover part of the prism sheet 19 on the side wall 20a side to shield light emitted from a partial area of the emission face 16a of the light-guiding plate 16, thereby defining the effective area 90, through which light is emitted from the planar illumination apparatus 10.

The light-shielding sheet 30 includes the first light-shielding sheet 30a and the second light-shielding sheet 30b. The first light-shielding sheet 30a is a single-sided tape that can shield light, for example; one end part thereof is attached to the outer face of the side wall 20a of the frame 20. The second light-shielding sheet 30b is a double-sided tape that can shield light, for example. Out of the two faces of the second light-shielding sheet 30b, one end side of one face is attached to a part of the other end side of the first light-shielding sheet 30a, whereas the other end side of the one face is attached to a part of the prism sheet 19 on the side wall 20a side. The other face of the second light-shielding sheet 30b is attached to the liquid crystal display apparatus that uses the planar illumination apparatus 10 as the backlight.

The external connecting parts 50 are inserted into the holes 60 and are bent along the outer face of the bottom 20b.

Figure 5A:
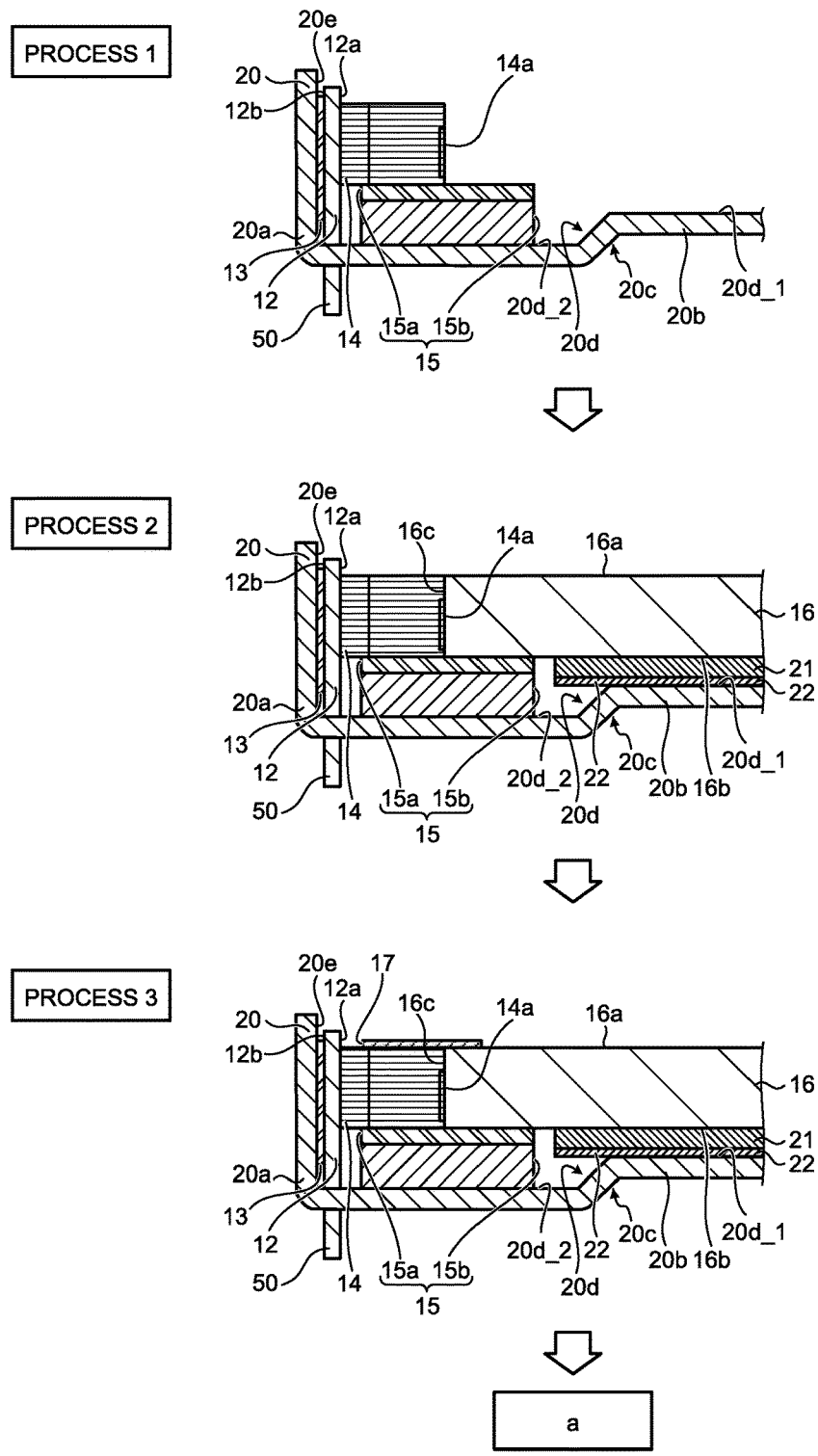
FIG. 5A is a diagram illustrating an example of a method for assembling the planar illumination apparatus according to the embodiment.
Figure 5B:
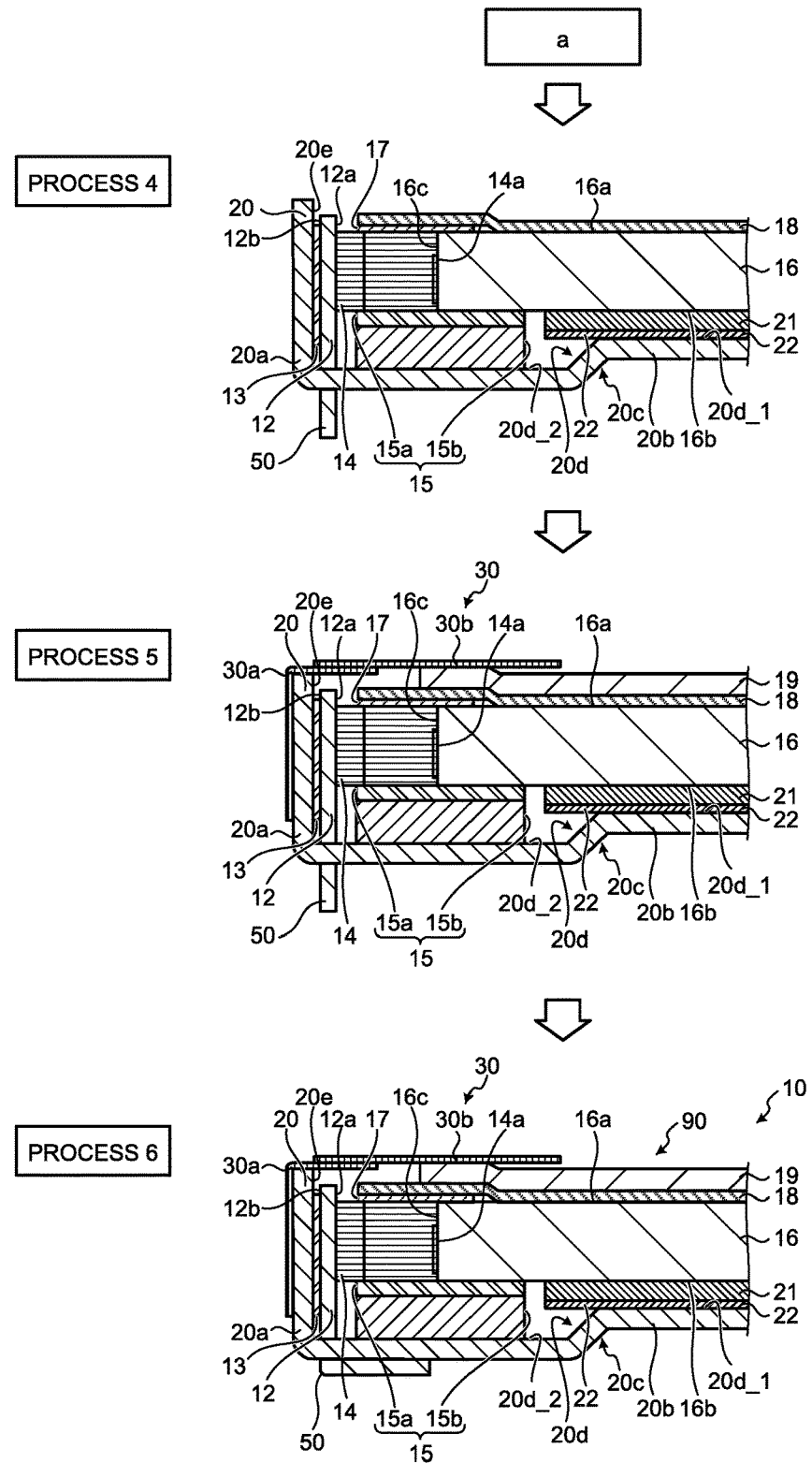
FIG. 5B is diagram illustrating the example of the method for assembling the planar illumination apparatus according to the embodiment.

The following describes a method for assembling the planar illumination apparatus 10 with reference to FIG. 5A and FIG. 5B. FIG. 5A and FIG. 5B are diagrams illustrating an example of the method for assembling the planar illumination apparatus 10 according to the embodiment.

As illustrated in FIG. 5A, in Process 1, first, the LEDs 14 are mounted on the mounting face 12a of the FPC 12. Next, the first coupling member 15 is mounted on at least a part of the face of the LEDs 14 on the floor face 20d. With the external connecting parts 50 of the FPC 12 inserted into the holes 60, the principal face 12b of the FPC 12 is fixed to the side face 20e of the frame 20 using the fixing member 13.

Figure 6:
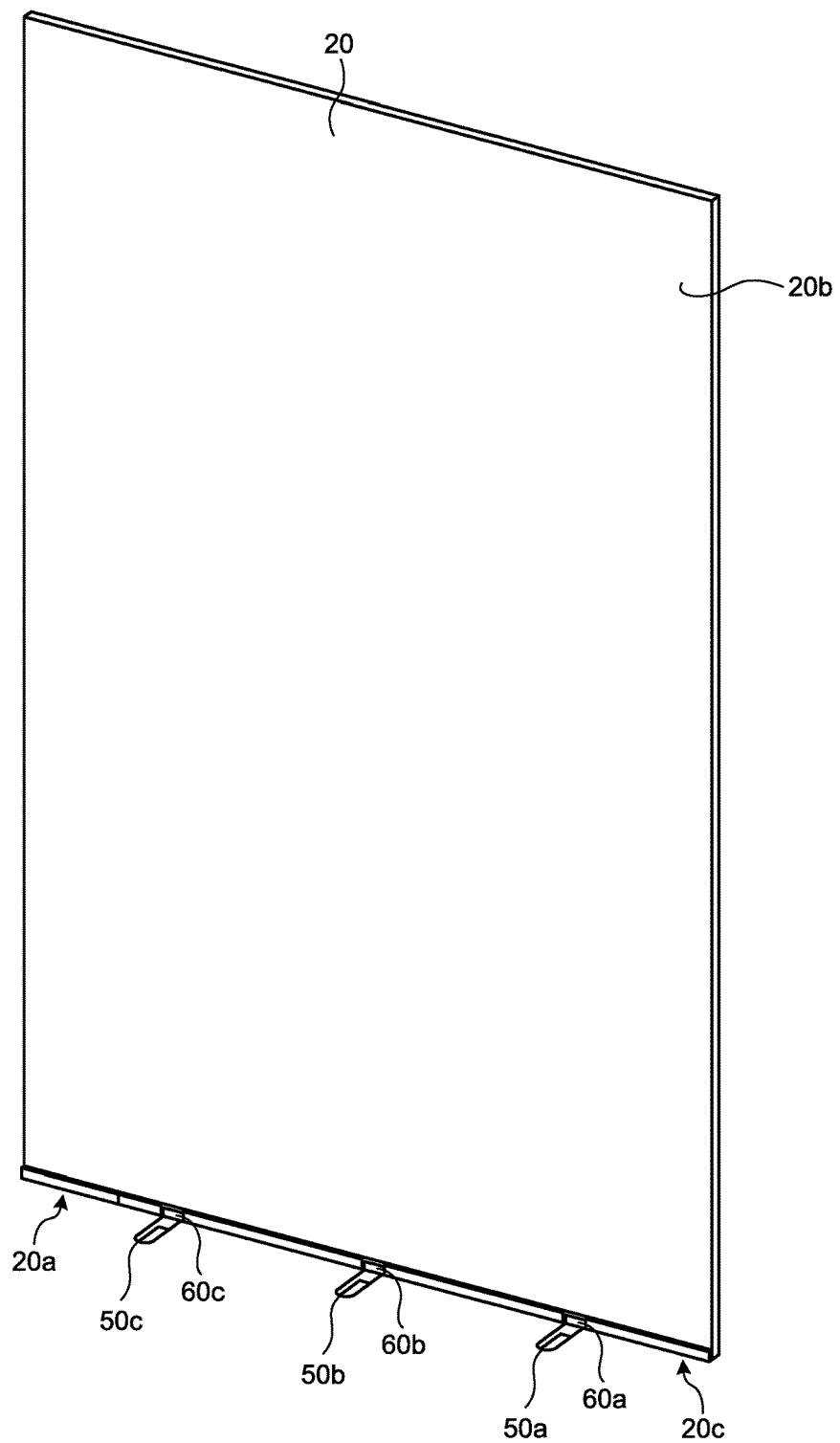
FIG. 6 is a diagram of an example of the positional relation between external connecting parts and a frame.
Figure 7:
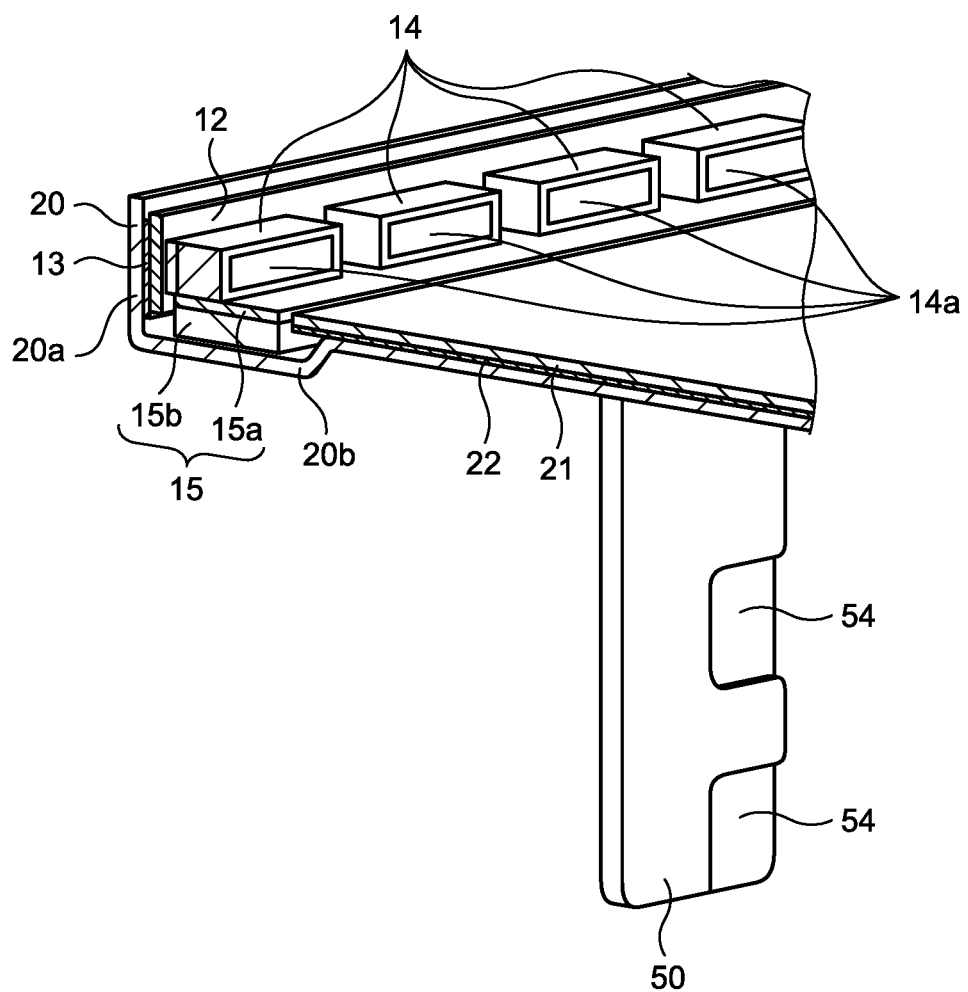
FIG. 7 is a partially enlarged perspective view of an example of the positional relation between one of the external connecting parts and peripheral members of the external connecting part.

The following describes an example of the positional relation between the external connecting parts 50 (50a, 50b, and 50c) and peripheral members of the external connecting parts 50 when the principal face 12b has been fixed to the side face 20e by the fixing member 13 in Process 1. FIG. 6 is a diagram of an example of the positional relation between the external connecting parts 50 and the frame 20, whereas FIG. 7 is a partially enlarged perspective view of an example of the positional relation between one of the external connecting parts 50 and the peripheral members of the external connecting part 50.

As illustrated in the example in FIG. 6, the three holes 60a to 60c are formed correspondingly to the three external connecting parts 50a to 50c, respectively, astride the part of the recess 20c of the frame 20 on the side wall 20a side and the part of the side wall 20a on the recess 20c side. As illustrated in the example in FIG. 6, in Process 1, the principal face 12b is fixed to the side face 20e by the fixing member 13 with the external connecting parts 50a to 50c inserted into the holes 60a to 60c, respectively. As illustrated in the examples in FIG. 7, the external connecting parts 50 formed with the connecting pads 54 that have been inserted into the holes 60 are arranged so as to extend in the second direction.

In Process 2, with the floor face 20d (specifically, the recessed plane 20d_2 of the floor face 20d) as an alignment standard in a thickness direction, the optical axis of the light-guiding plate 16 (the center of the light-guiding plate 16 in the thickness direction, for example) and the optical axis of the LEDs 14 (the center of the LEDs 14 in the thickness direction, for example) are aligned with each other, and with the two optical axes aligned with each other, at least a part of the principal face 16b of the light-guiding plate 16 is mounted on the first coupling member 15. With this mounting, the optical axis of the light-guiding plate 16 and the optical axis of the LEDs 14 are aligned with each other, and the light-guiding plate 16 is fixed to the LEDs 14 with the light-incident side face 16c of the light-guiding plate 16 and the light-emitting faces 14a of the LEDs 14 coupled with each other. Consequently, the planar illumination apparatus 10 according to the present embodiment improves the accuracy of aligning the optical axes between the light-guiding plate 16 and the LEDs 14. Consequently, the planar illumination apparatus 10 according to the present embodiment can stabilize luminance characteristics such as luminance and luminance distribution at a high level. In addition, the planar illumination apparatus 10 according to the present embodiment can respond to a demand for thinning, because the thickness of the first coupling member 15 that couples the light-guiding plate 16 and the LEDs 14 with each other is small. From the foregoing, the planar illumination apparatus 10 according to the present embodiment can achieve excellent luminance characteristics while responding to the demand for thinning.

In Process 2, when the light-guiding plate 16 is mounted on the first coupling member 15, the reflective sheet 21 may be fixed to the floor face 20d (specifically, the plane 20d_1 of the floor face 20d) using the double-sided tape 22.

In Process 3, one face of the second coupling member 17 as the double-sided tape is attached to at least a part of the emission face 16a of the light-guiding plate 16 close to the LEDs 14 and is attached to at least a part of the face of the LEDs 14 opposite the floor face 20d close to the light-guiding plate 16. Consequently, the second coupling member 17 can couple the light-incident side face 16c of the light-guiding plate 16 and the light-emitting faces 14a of the LEDs 14 with each other.

As illustrated in FIG. 5B, in Process 4, the other face of the second coupling member 17 is attached to at least a part of the diffusion sheet 18 on the side wall 20a side.

In Process 5, the prism sheet 19 is arranged on the diffusion sheet 18 opposite the light-guiding plate 16. In Process 5, the one end part of the first light-shielding sheet 30a as the single-sided tape is attached to the outer face of the side wall 20a of the frame 20. In Process 5, one end side of one face of the two faces of the second light-shielding sheet 30b as the double-sided tape is attached to a part of the other end side of the first light-shielding sheet 30a, whereas the other end side of the one face is attached to a part of the prism sheet 19 on the side wall 20a side.

In Process 6, the external connecting parts 50 are bent so as to follow the outer face of the bottom 20b.

Figure 8:
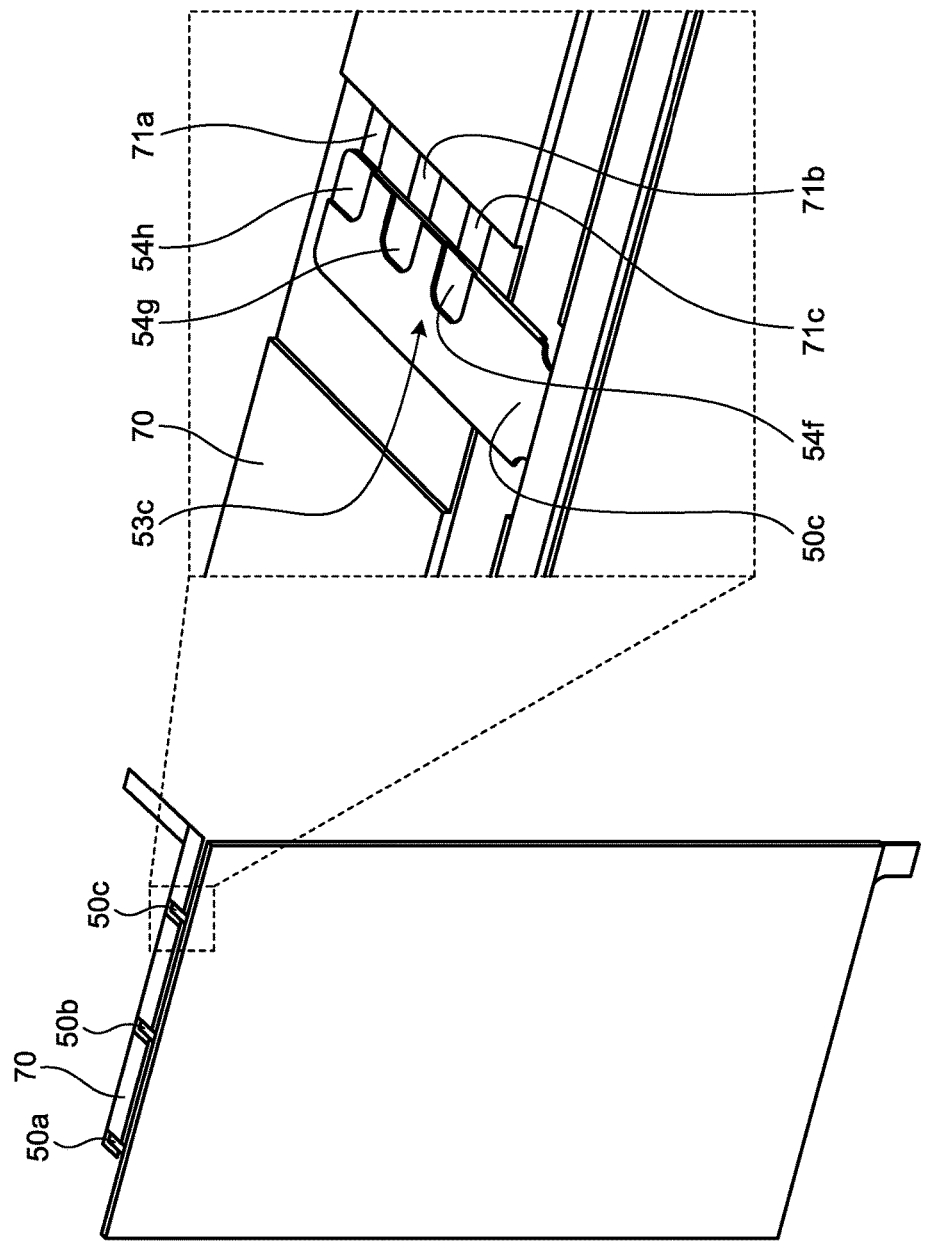
FIG. 8 is a diagram illustrating an example of Process 6.
Figure 9:
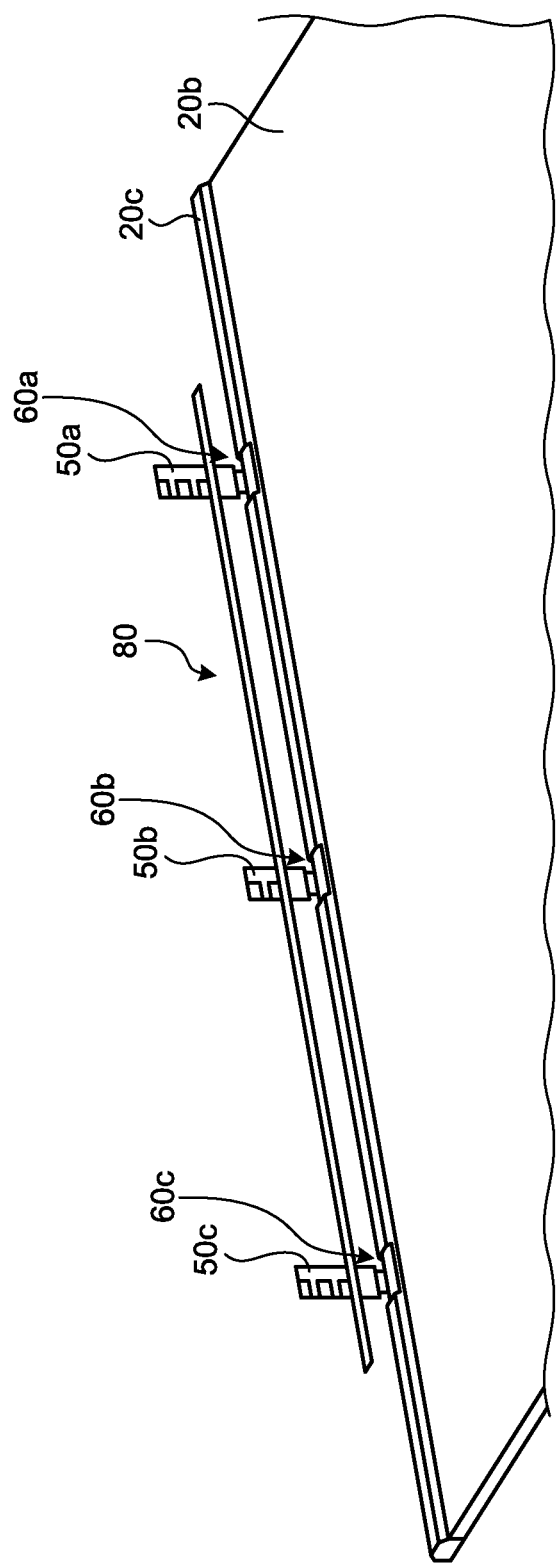
FIG. 9 is a diagram illustrating an example of Process 6.
Figure 10:
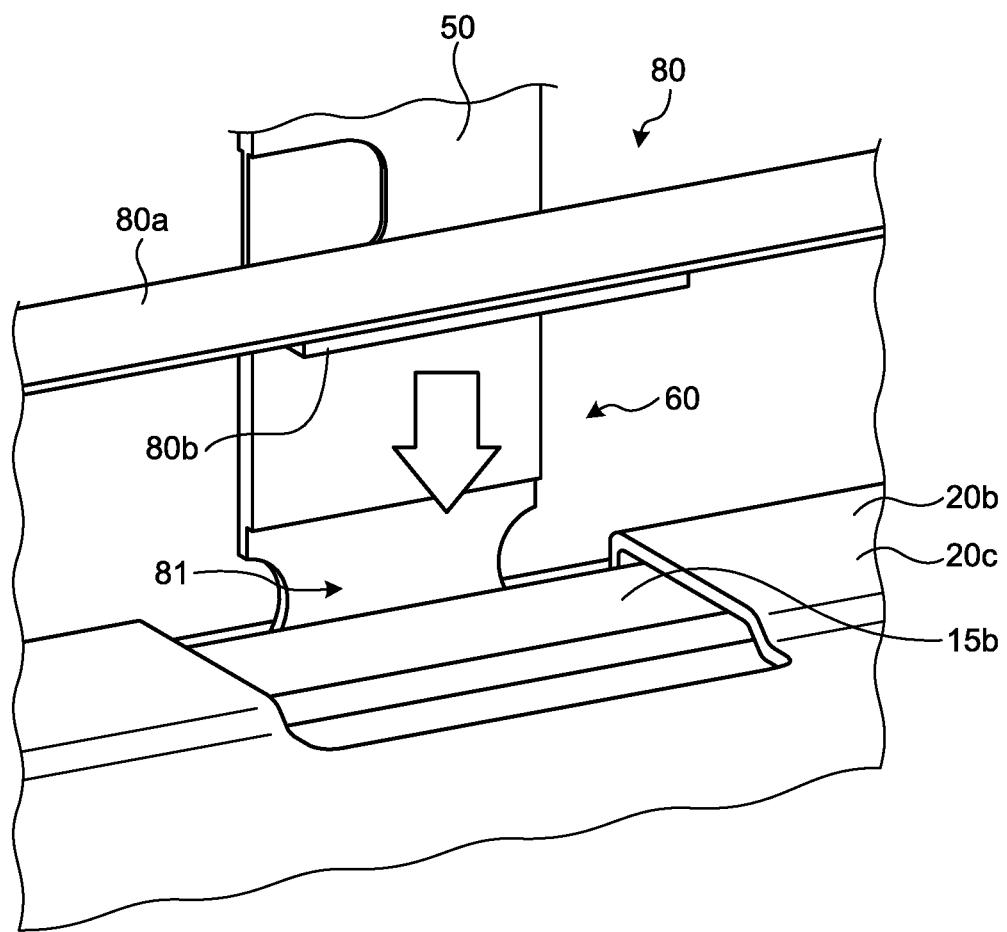
FIG. 10 is a diagram illustrating an example of Process 6.

The following describes the details of Process 6 with reference to FIGS. 8 to 10. In Process 6, the conducting parts 53 formed in the external connecting parts 50 are connected to the FPC 70 described below. FIGS. 8 to 10 are diagrams illustrating an example of Process 6. As illustrated in the example in FIG. 8, in Process 6, the connecting pad 54h of the conducting part 53c and wiring 71a of the FPC 70 are soldered to each other. In Process 6, similarly, the connecting pad 54g and wiring 71b of the FPC 70 are soldered to each other, and the connecting pad 54f and wiring 71c of the FPC 70 are soldered to each other. In this process, the drive circuit that drives and lights the LEDs 14 is connected to the FPC 70. Consequently, the drive circuit drives and lights the LEDs 14.

In Process 6, using the spacer tape 80 illustrated in FIG. 9, the external connecting parts 50a, 50b, and 50c are bent. The following describes a specific method for bending the external connecting parts 50 with reference to FIG. 10.

As illustrated in FIG. 10, the spacer tape 80 has a single-sided tape 80a and a base 80b such as PET. The base 80b is attached to the single-sided tape 80a corresponding to the positions of the holes 60. In Process 6, with the base 80b being in contact with the base 15b and arranged in the holes 60, the single-sided tape 80a is attached to the recess 20c of the bottom 20b. In Process 6, with the base 80b being in contact with a contact place 81 with which the base 80b is in contact of the external connecting parts 50 that have been inserted into the holes 60, the external connecting parts 50 are bent so as to cover the base 80b. The external connecting parts 50 are thus bent on the basis of the base 80b of the spacer tape 80, and the external connecting parts 50 can be bent at right angles from the contact place 81. With this bending, when the external connecting parts 50 are bent, the FPC 12 fixed to the side face 20e by the fixing member 13 can be prevented from falling off from the side face 20e. The bent external connecting parts 50 extend from the contact place 81 with the base 80b along the outer faces of the base 80b and the bottom 20b. The base 80b may be attached to the base 15b without using the spacer tape 80 to bend the external connecting parts 50.

The planar illumination apparatus 10 according to the present embodiment has been described. As described above, the planar illumination apparatus 10 according to the present embodiment can be thinned even when the top view type LEDs 14 are used.

First Modification of Embodiment

Although the embodiment describes the example in which the first coupling member 15 is arranged on the recessed plane 20d_2 of the floor face 20d, the first coupling member 15 may be arranged on the plane 20d_1 of the floor face 20d. The following then describes such an embodiment as the planar illumination apparatus 10 according to a first modification of the embodiment. In the description of the first modification, components similar to those of the embodiment are denoted by the same symbols, and descriptions thereof may be omitted.

Figure 11:
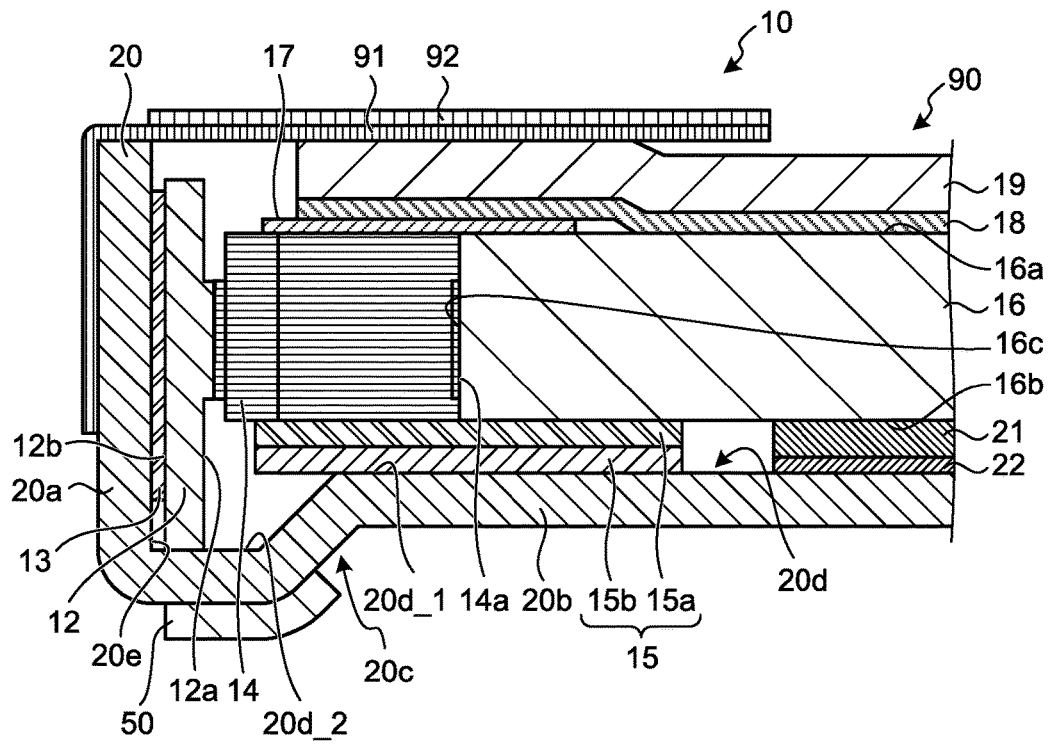
FIG. 11 is a diagram illustrating a planar illumination apparatus according to a first modification of the embodiment.

FIG. 11 is a diagram illustrating the planar illumination apparatus according the first modification of the embodiment. The planar illumination apparatus 10 according to a first modification illustrated in FIG. 11 is different from the planar illumination apparatus 10 according to the embodiment illustrated in FIG. 2 in that the first coupling member 15 is arranged on the plane 20d_1 of the floor face 20d and that two light-shielding sheets 91 and 92 are included.

As illustrated in FIG. 11, the first coupling member 15 is arranged on the plane 20d_1 of the floor face 20d, and the width of the recess 20c is formed to be smaller so as to arrange the first coupling member 15 having a larger size on the plane 20d_1 of the floor face 20d.

The light-shielding sheet 91 is arranged so as to cover part of the prism sheet 19 on the side wall 20a side to shield light emitted from a partial area of the emission face 16a of the light-guiding plate 16, thereby defining the effective area 90, through which light is emitted from the planar illumination apparatus 10.

The light-shielding sheet 91 is a single-sided tape that can shield light, for example; one end part thereof is attached to the outer face of the side wall 20a of the frame 20. A face of the other end part of the light-shielding sheet 91 on the prism sheet 19 side is attached to part of the prism sheet 19 on the side wall 20a side.

The light-shielding sheet 92 is a double-sided tape that can shield light. Out of the two faces of the light-shielding sheet 92, one face is attached to the other end part of the light-shielding sheet 91, whereas the other face is attached to the liquid crystal display apparatus that uses the planar illumination apparatus 10 as the backlight.

Second Modification of Embodiment

The following describes a second modification of the embodiment. In the description of the second modification, components similar to those of the embodiment are denoted by the same symbols, and descriptions thereof may be omitted.

Figure 12:
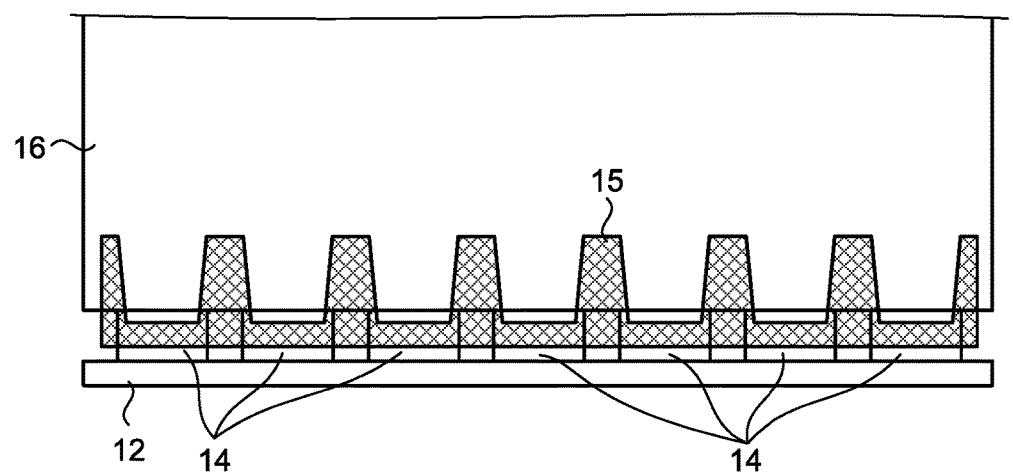
FIG. 12 is a diagram illustrating a planar illumination apparatus according to a second modification of the embodiment.

FIG. 12 is a diagram illustrating a planar illumination apparatus according the second modification of the embodiment. As illustrated in FIG. 12, the first coupling member 15 is provided only at an area except for the front of the LEDs 14, that is, a light-emitting direction. Consequently, at the front of the respective LEDs 14, only an air layer is present between the principal face 16b (refer to FIG. 2) of the light-guiding plate 16 and the floor face 20d (refer to FIG. 2). Therefore, light that has been emitted to the front of the LEDs 14, has been made incident on the light-incident side face 16c, and has reached the principal face 16b, does not enter the first coupling member 15 (the adhesive layer 15a) with large transmittance but is guided to the inside of the light-guiding plate 16 through normal reflection at an interface between the light-guiding plate 16 and air. Consequently, the planar illumination apparatus according to the second embodiment can improve luminance.

Although the second modification describes the example in which the first coupling member 15 is provided only at the area except for the light-emitting direction of the LEDs 14, the adhesive layer 15a may be provided only at the area except for the light-emitting direction of the LEDs 14, whereas the base 15b may be shaped similarly to that of the embodiment, that is, strip-shaped.

One embodiment of the present invention can be thinned even when top view type LEDs are used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus comprising:
   a light-guiding plate that emits light made incident from a side face of the light-guiding plate;
   a plurality of light sources that are arranged on the side face side of the light-guiding plate and have respective light-emitting faces that emit light to be made incident on the side face of the light-guiding plate;
   a substrate having a mounting face on which the plurality of light sources are mounted, the mounting face facing a face of the plurality of light sources opposite the light-emitting faces; and
   wiring that is formed on a face of the substrate opposite the mounting face and are connected to the plurality of light sources, wherein
   the plurality of light sources are mounted while being arranged in a first direction on the mounting face;
   a plurality of light source rows including the plurality of light sources connected in series are mounted on the mounting face while being arranged in the first direction;
   the wiring includes wiring extending from both ends of the plurality of light source rows;
   at least one external connecting part is provided for each of the plurality of light source rows or every two of the plurality of light source rows adjacent in the first direction, and
   wiring formed on the face of the substrate opposite the mounting face in one of the plurality of light source rows does not overlap in a second direction with wiring formed on the face of the substrate opposite the mounting face in another of the plurality of light source rows.

2. The planar illumination apparatus according to claim 1, wherein part of the wiring is formed on the face of the substrate opposite the mounting face along the first direction at central part in the second direction crossing the first direction.

3. The planar illumination apparatus according to claim 1, wherein the at least one external connecting part comprises a plurality of external connecting parts.

4. The planar illumination apparatus according to claim 1, further comprising:
   a frame that has a side wall and a bottom wall that house the light-guiding plate, the plurality of light source rows, and the substrate, the frame having a hole formed at least in the bottom wall; and
   a base that is arranged in the hole while being in contact with the at least one external connecting part, wherein the at least one external connecting part is inserted into the hole and extends from a contact place with the base along outer faces of the base and the bottom wall.

5. The planar illumination apparatus according to claim 1, wherein the external connecting part is provided between two of the plurality of light source rows adjacent in the first direction.

6. A substrate comprising:
   a mounting face on which a plurality of light source rows including a plurality of light sources connected in series are mounted while being arranged in a first direction;
   wiring that is formed on a face of the substrate opposite the mounting face and includes wiring extending from both ends of the plurality of light source rows; and
   at least one external connecting part that connects a drive circuit that lights the plurality of light source rows and the plurality of light sources; wherein
   the at least one external connecting part is provided for each of the plurality of light source rows or every two of the plurality of light source rows adjacent in the first direction so that wiring in one of the plurality of light source rows does not overlap in a second direction crossing the first direction with wiring in another of the plurality of light source rows.

7. The substrate according to claim 6, wherein the at least one external connecting part comprises a plurality of external connecting parts.

8. The substrate according to claim 6, wherein the external connecting part is provided between the two of the plurality of light source rows adjacent in the first direction.

9. A planar illumination apparatus comprising:
   a light-guiding plate that emits light made incident from a side face of the light-guiding plate;
   a plurality of light sources that are arranged on the side face side of the light-guiding plate and that emit light to be made incident on the side face of the light-guiding plate;
   a substrate having a mounting face on which the plurality of light sources are mounted; and
   wiring that is formed on a face of the substrate opposite the mounting face and are connected to the plurality of light sources, wherein
   the plurality of light sources are mounted while being arranged in a first direction on the mounting face;
   a plurality of light source rows including the plurality of light sources connected in series are mounted on the mounting face while being arranged in the first direction;
   the wiring includes wiring extending from an end of each of the plurality of light source rows;
   part of the wiring is formed along the first direction;
   at least one external connecting part is provided for each of the plurality of light source rows or every two of the plurality of light source rows adjacent in the first direction, and wiring extending from an end of each of the plurality of light source rows in each of the plurality of light source rows does not overlap in a second direction with wiring formed on the face of the substrate opposite the mounting face in another of the plurality of light source rows.

10. The planar illumination apparatus according to claim 9, wherein the at least one external connecting part comprises a plurality of external connecting parts.

11. The planar illumination apparatus according to claim 9, wherein the external connecting part is provided between the two of the plurality of light source rows adjacent in the first direction.

\* \* \* \* \*